(12) United States Patent
Blinder et al.

(10) Patent No.: US 8,009,404 B2
(45) Date of Patent: Aug. 30, 2011

(54) REDUNDANT POWER SUPPLY WITH A SWITCHABLE, LINEAR VOLTAGE REGULATOR

(75) Inventors: Gennadiy Blinder, Germantown, MD (US); Gregory F. Pensero, Abingdon, MD (US); Long T. Nguyen, White Marsh, MD (US); William P. Burgess, Finksburg, MD (US); Joseph J. Sedlak, Essex, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 630 days.

(21) Appl. No.: 11/962,090

(22) Filed: Dec. 21, 2007

(65) Prior Publication Data

US 2010/0265628 A1   Oct. 21, 2010

(51) Int. Cl.
*H01H 9/00* (2006.01)
*H01H 47/00* (2006.01)
*H01H 51/22* (2006.01)
*H01H 51/30* (2006.01)
*H02J 9/00* (2006.01)

(52) U.S. Cl. .......................................... 361/160; 307/64
(58) Field of Classification Search .................. 361/160; 307/64
See application file for complete search history.

(56) References Cited

U.S. PATENT DOCUMENTS 5,892,298 A * 4/1999 Levasseur ........................ 307/64
5,986,896 A * 11/1999 Gibart et al. .................... 363/16

* cited by examiner

*Primary Examiner* — Jared Furema
*Assistant Examiner* — Lucy Thomas
(74) *Attorney, Agent, or Firm* — DeMont & Breyer, LLC (57) ABSTRACT

A system is provided that effectively obviates shortcomings of conventional, diode-ORed, redundant power supply systems by forcing a primary power source to provide power to the system load most the time, even when the primary source provides a lower voltage than that of a secondary power source. This preferential selection of the lower-voltage primary is achieved by interposing a power switching unit between the secondary power source and the ORing diode in front of the load. The power switching unit of the illustrative embodiment comprises a voltage regulator that is regulated at a first voltage level, which is lower than the nominal output voltage level provided by the primary power source. Meanwhile, the primary power source is able to charge the secondary power source, which is a battery in the illustrative embodiment, so that the secondary power source can provide power to the load when the primary power source is either interrupted or falls below the first voltage level.

20 Claims, 7 Drawing Sheets

REDUNDANT POWER SUPPLY WITH A SWITCHABLE, LINEAR VOLTAGE REGULATOR

STATEMENT REGARDING FEDERALLY-SPONSORED RESEARCH

This invention was made with Government support under W31P4Q-04-C-0059 awarded by the Department of the Army. The Government has certain rights in the invention.

FIELD OF THE INVENTION

The present invention relates to power supplies in general, and, more particularly, to switchover circuits for redundant power supplies.

BACKGROUND OF THE INVENTION

Power supplies for electronic equipment often need to provide more than one possible source of power to a system load, for reasons of redundancy. The multiple power sources might have the same power characteristics or they might be different from each other. For example, different power sources might be configured to provide power at different voltages. Where the power sources are different, or at least where one is typically preferred over another, the preferred power source is typically designated as the primary power source and the other is designated as the secondary power source.

When both a primary and secondary power source are required, a power supply should be designed so that when the primary source fails, the secondary source will immediately take over without an interruption in the operation of the equipment being powered. This is especially true in military applications, in which the equipment is required to conform to a demanding set of performance specifications.

Figure 1:
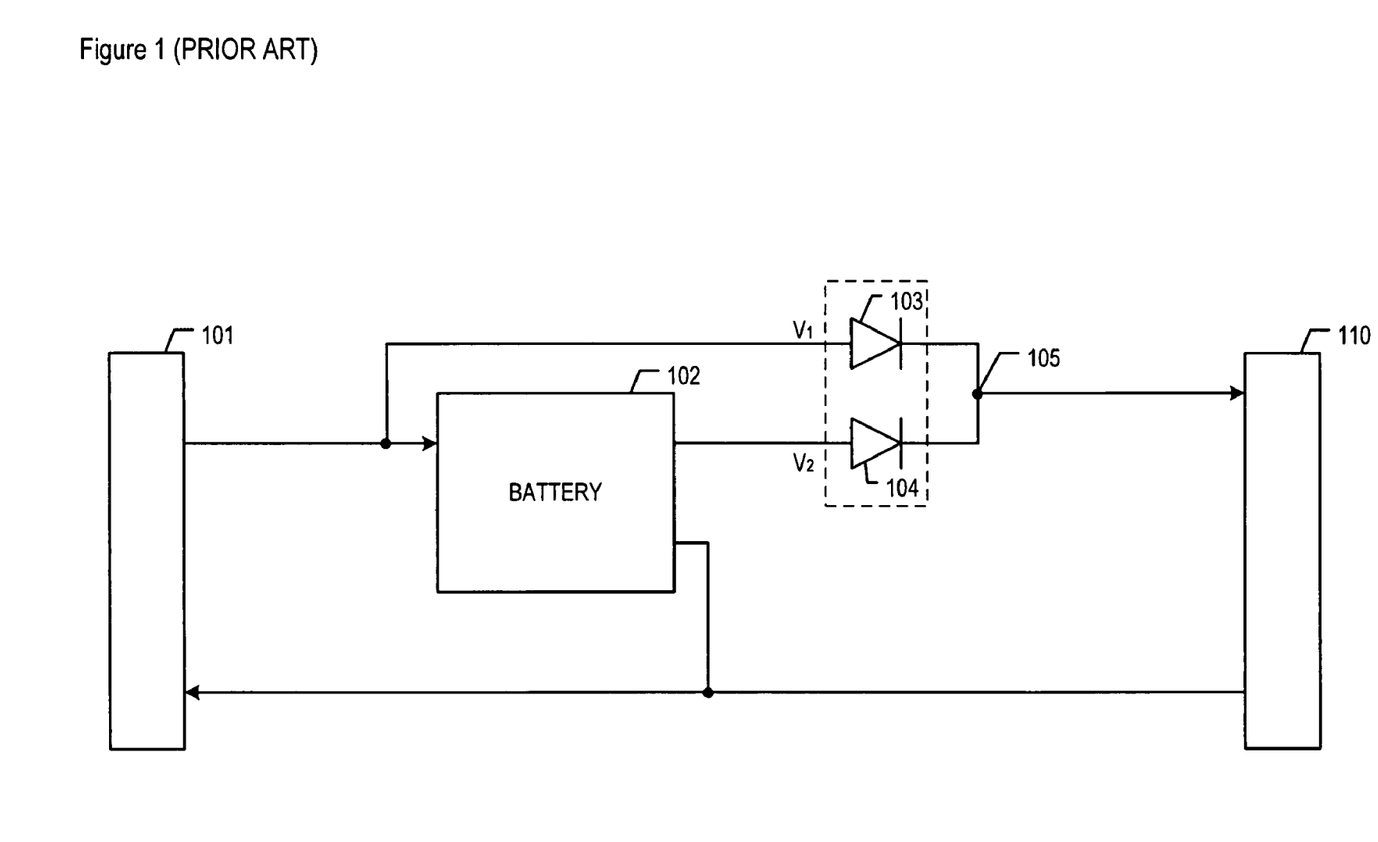
FIG. 1 in the prior art depicts a block diagram of a redundant power supply.

FIG. 1 in the prior art depicts a block diagram of a redundant power supply, in which primary power source 101 and secondary power source 102 provide power to system load 110. Load 110 comprises the equipment that is being powered. Sources 101 and 102 are connected to load 110 by means of a relatively common technique called "diode-ORing." The two power supplies are connected to load 110 through associated ORing-diodes 103 and 104, respectively, wherein source 101 provides voltage $V_1$ and source 102 provides voltage $V_2$. With the two power sources diode-ORed together, the power source with the larger output voltage will establish the voltage that is delivered to load 110 and which is present at node 105. By connecting the power sources in this way, if one power source fails, the other source will take up load 110 with little or no interruption in the power that is provided.

As is the case with the prior-art system depicted in FIG. 1, the primary power source, in addition to providing power to load 110 whenever possible, can also be used to charge the secondary power source, which is a battery in this case. When the primary power source is interrupted, because the battery-based secondary power source is kept charged, it can take over for the primary source.

There are operational scenarios, however, in which the secondary source's output voltage, $V_2$, is higher than the primary source's output voltage, $V_1$. For example, the primary power source might be designed to deliver 28 Volts DC at $V_1$, and the secondary power source might be designed to deliver 33.6 Volts DC at $V_2$, as is the case in certain military applications. In this case, the ORing diodes will select $V_2$ as the voltage to be delivered to the load, as provided by the secondary power source. Ordinarily, this might be acceptable, especially if the battery of the secondary source is a more reliable source of power than the primary source. However, a mode of operation in which the secondary power source is normally selected might not be either desirable or sustainable—particularly, for example, if the lower-voltage primary source is being used to charge the higher-voltage secondary source.

It is, therefore, desirable to have the secondary power source charging and available as a backup to the primary power source during periods of low-power demand and also to have the primary power source available as a backup for the secondary power source during periods of high-power demand. To achieve this, what is needed is a power supply system without some of the disadvantages in the prior art.

SUMMARY OF THE INVENTION

In accordance with the present invention, shortcomings of conventional, diode-ORed, redundant power supply systems, such as those described above, are effectively obviated by a new and improved control mechanism. The mechanism forces a primary power source to provide power to the system load most of the time, even when the primary source provides a lower voltage than that of a secondary power source. This preferential selection of the lower-voltage primary is achieved by interposing a power switching unit between the secondary power source and the ORing diode in front of the load. The power switching unit of the illustrative embodiment comprises a controller, secondary-power relay, and voltage regulator. The voltage regulator of the illustrative embodiment is regulated at a first voltage level, which is lower than the nominal output voltage level provided by the primary power source. Meanwhile, the primary power source is able to charge the secondary power source, which is a battery in the illustrative embodiment, so that the secondary power source can provide power to the load when the primary power source is either interrupted or falls below the first voltage level.

The normal operational mode of the power switching unit is summarized here. The controller initially i) opens the secondary-power relay, thereby cutting off the ORing diode from the battery of the secondary power source, and ii) directs the battery to be charged, such as by the primary power source. In the event that the primary power source falls below a threshold voltage, which is related to the first output voltage level of the regulator, the voltage regulator begins to conduct current to supply the system load. The control circuit of the voltage regulator then transitions quickly from a linear control of the regulator's MOSFET transistors to fully saturating control. If this condition exists for less than a predetermined time interval, such as a few seconds, the voltage regulator then provides power to the system load for the remainder of the time interval. Once the time interval has elapsed, the controller then closes the secondary-power relay, thereby bypassing the voltage regulator entirely and completing a seamless power changeover to the secondary power source.

The power switching unit of the illustrative embodiment is advantageous over some systems in the prior art because it increases the flexibility of a conventional, diode-ORed power supply by enabling the source with the lower output voltage—in this case, the primary power source—to provide power to the system load for normal operation. And when the load requires the higher voltage level from the secondary power source, such as during periods of high power demand, the power switching unit is able to switch in the secondary source, wherein diode-ORing of the two sources is again achieved with the higher-voltage secondary source providing power to the load.

Although the voltage regulator circuit of the illustrative embodiment has been applied towards the enablement of power switching, in some alternative embodiments the voltage regulator circuit can be used for other applications, as those who are skilled in the art will appreciate.

The illustrative embodiment of the present invention comprises: a relay having a first terminal and a second terminal, the first terminal of the relay being electrically coupled to a secondary power source; a voltage regulator circuit having an input terminal and an output terminal, the input terminal of the voltage regulator circuit being electrically coupled to the first terminal of the relay, the output terminal of the voltage regulator circuit being electrically coupled to the second terminal of the relay, and the voltage regulator circuit being capable of selecting between a first output voltage and a second output voltage, wherein the second output voltage is based on a voltage that is present at the input terminal, and the selected output voltage is applied to the output terminal of the voltage regulator circuit; and a first diode and a second diode, each having a first terminal and a second terminal, the first terminal of the first diode being electrically coupled to a primary power source, the second terminal of the first diode being electrically coupled to a load, the first terminal of the second diode being electrically coupled to the second terminal of the relay, and the second terminal of the second diode being electrically coupled to the load.

DETAILED DESCRIPTION

Before describing the embodiments of the present invention, it should be observed that the invention resides primarily, but not exclusively, in a prescribed arrangement of conventional power supply circuit components and regulation circuitry therefor, which circuitry controls the operation of such components. As a result, the configuration of such components and the manner in which they may be interfaced with other equipment, have, for the most part, been shown in the drawings by readily understandable block diagrams, which depict only those specific details that are pertinent to the present invention, so as not to obscure the disclosure with details which will be readily apparent to those skilled in the art having the benefit of the description herein. Thus, the block diagrams of the Figures are primarily intended to show the major components of the invention in convenient functional groupings, so that the invention may be more readily understood. Furthermore, as those who are skilled in the art will appreciate, other components may be interposed throughout the actual design without detracting from the present invention.

Figure 2:
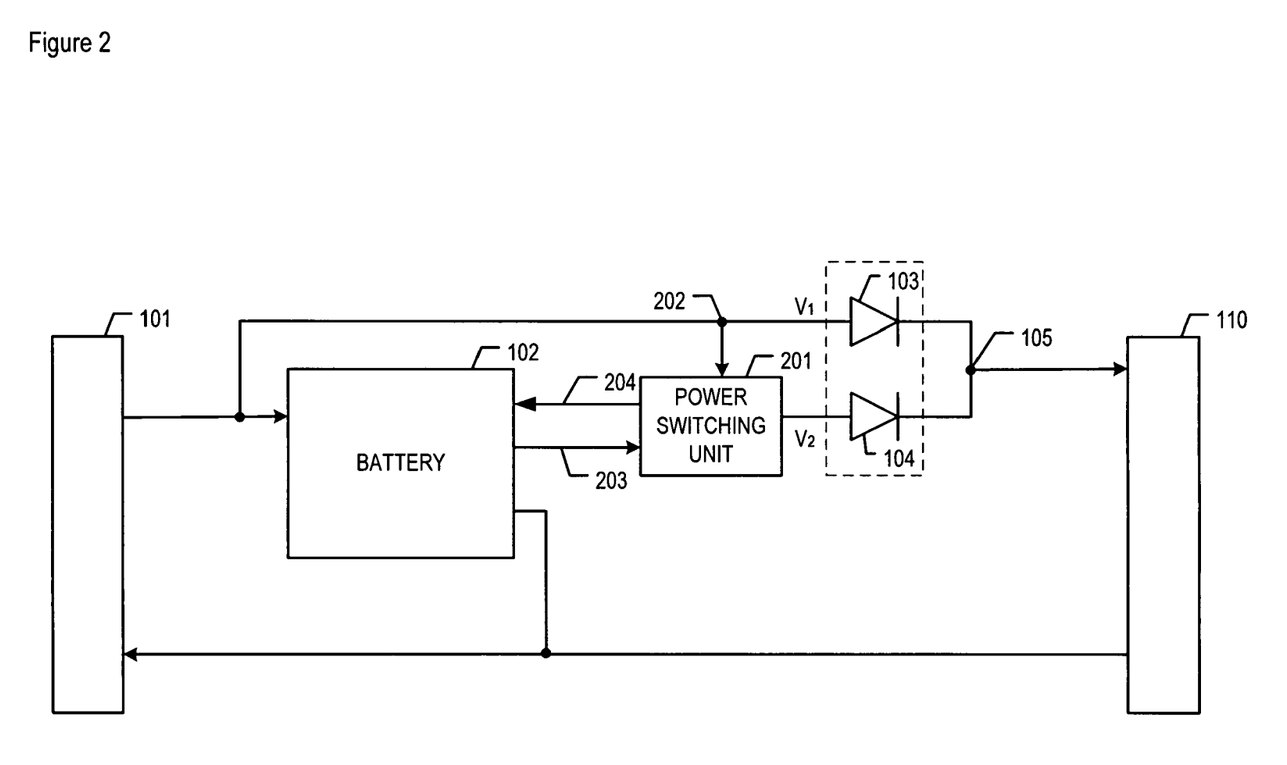
FIG. 2 depicts a block diagram of a redundant power supply comprising power switching unit 201, in accordance with the illustrative embodiment of the present invention.

FIG. 2 depicts a block diagram of the redundant power supply of the illustrative embodiment, in which primary power source 101 and secondary power source 102 provide power to system load 110. Sources 101 and 102 are connected to load 110 by means of a relatively common technique called "diode-ORing." The two power supplies are connected to load 110 through associated ORing-diodes 103 and 104, respectively, wherein source 101 provides voltage $V_1$ and source 102 provides voltage $V_2$. With the two power sources diode-ORed together, the power source with the larger output voltage will establish the voltage delivered to load 110 and present at node 105. By connecting the power sources in this way, if one power source fails the other source will take up load 110 with little or no interruption in the power provided.

Power switching unit 201 is interposed between secondary power source 102 and ORing diode 104, and provides the switching between the primary and second power source in accordance with the illustrative embodiment. Unit 201 accepts power from source 102 via path 203 and also controls a charging function at source 102 via path 204. In some alternative embodiments, however, a different device than unit 201 controls the charging function. Unit 201 is described below and with respect to FIG. 3.

Although the redundant power supply of the illustrative embodiment switches between a primary power source that is not a battery and a secondary power source that is a battery, it will be clear to those skilled in the art, after reading this specification, how to make and use alternative embodiments in which the source of the power to the load is switchable between two other types of power sources.

Figure 3:
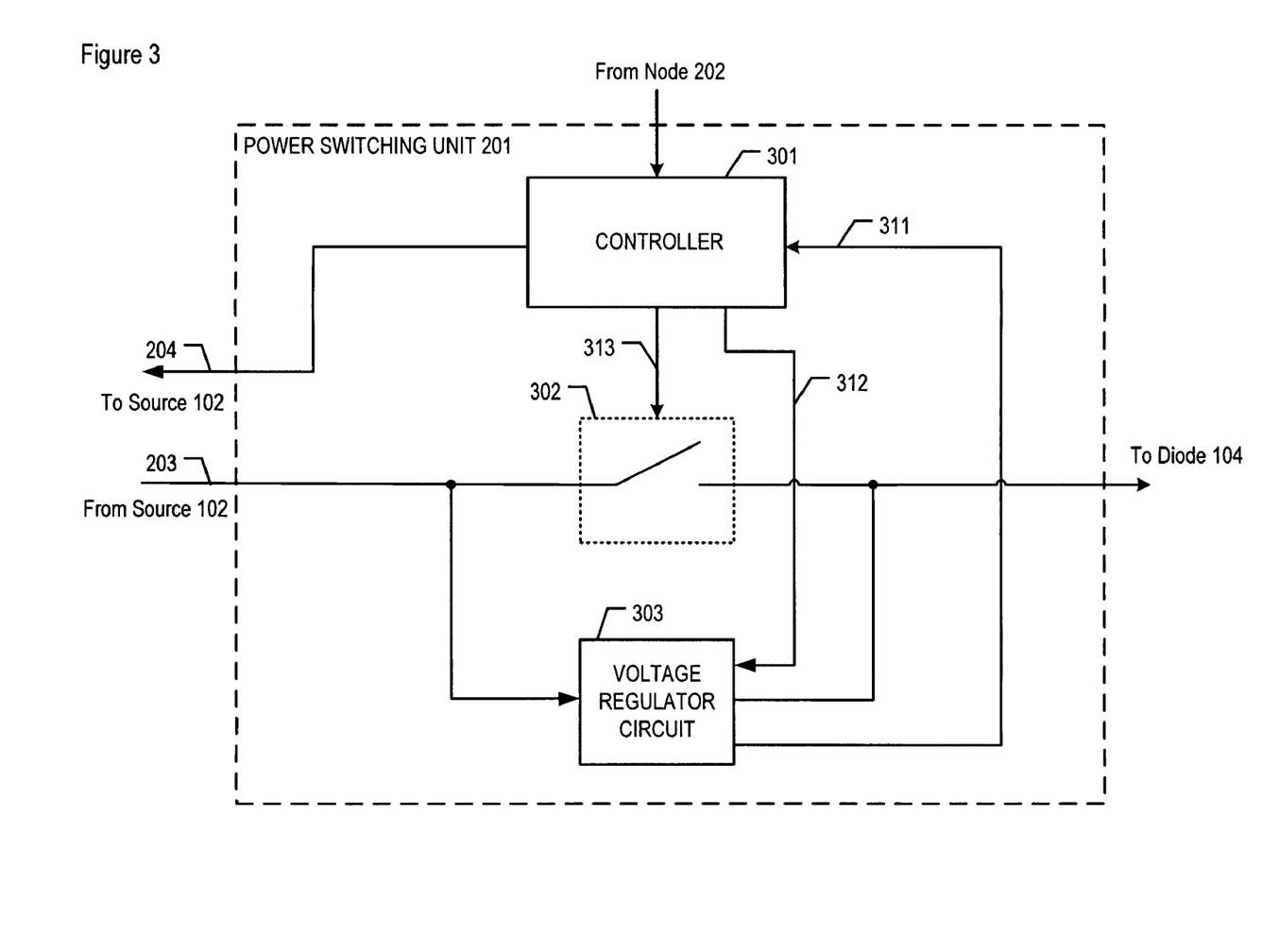
FIG. 3 depicts a block diagram of the salient components of power switching unit 201, comprising controller 301, relay 302, and voltage regulator circuit 303.

FIG. 3 depicts a block diagram of the salient components of power switching unit 201, in accordance with the illustrative embodiment of the present invention. Unit 201 comprises controller 301, secondary-power relay 302, and voltage regulator circuit 303, interconnected as shown.

Controller 301 is a processing-capable component, such as a Field-Programmable Gate Array (FPGA), which is capable of controlling relay 302 and voltage regulator circuit 303 in well-known fashion, via respective paths 313 and 312. Controller 301 is capable of monitoring the output voltage delivered by primary source 101 and as measured at node 202, in well-known fashion. Controller 301 is also capable of monitoring whether a predetermined conducting current is present, by monitoring the signal level on path 311. Additionally, controller 301 is capable of controlling the charging of secondary source 102 via path 204, in well-known fashion; however, in some alternative embodiments, a component different from controller 301, and which is not necessarily part of power switching unit 201, controls the charging function. The salient tasks performed by controller 301 are described below and with respect to FIGS. 5 through 7.

Secondary-power relay 302 is a component that is used to switch in or out, in well-known fashion, the output voltage delivered from secondary source 102 through path 203 to ORing diode 104. Relay 302 accepts, via path 313, a control signal that originates at controller 301.

Voltage-regulator circuit 303 comprises circuitry that is used to switch, when relay 302 is open, between providing a first output voltage and a second output voltage to ORing diode 104, in accordance with the illustrative embodiment. Circuit 303 is also capable of measuring whether a predetermined conducting current is present and provides that indication to controller 301 via path 311. In order to operate, circuit 303 accepts one or more reference voltages. Circuit 303 is described below and with respect to FIG. 4.

Figure 4:
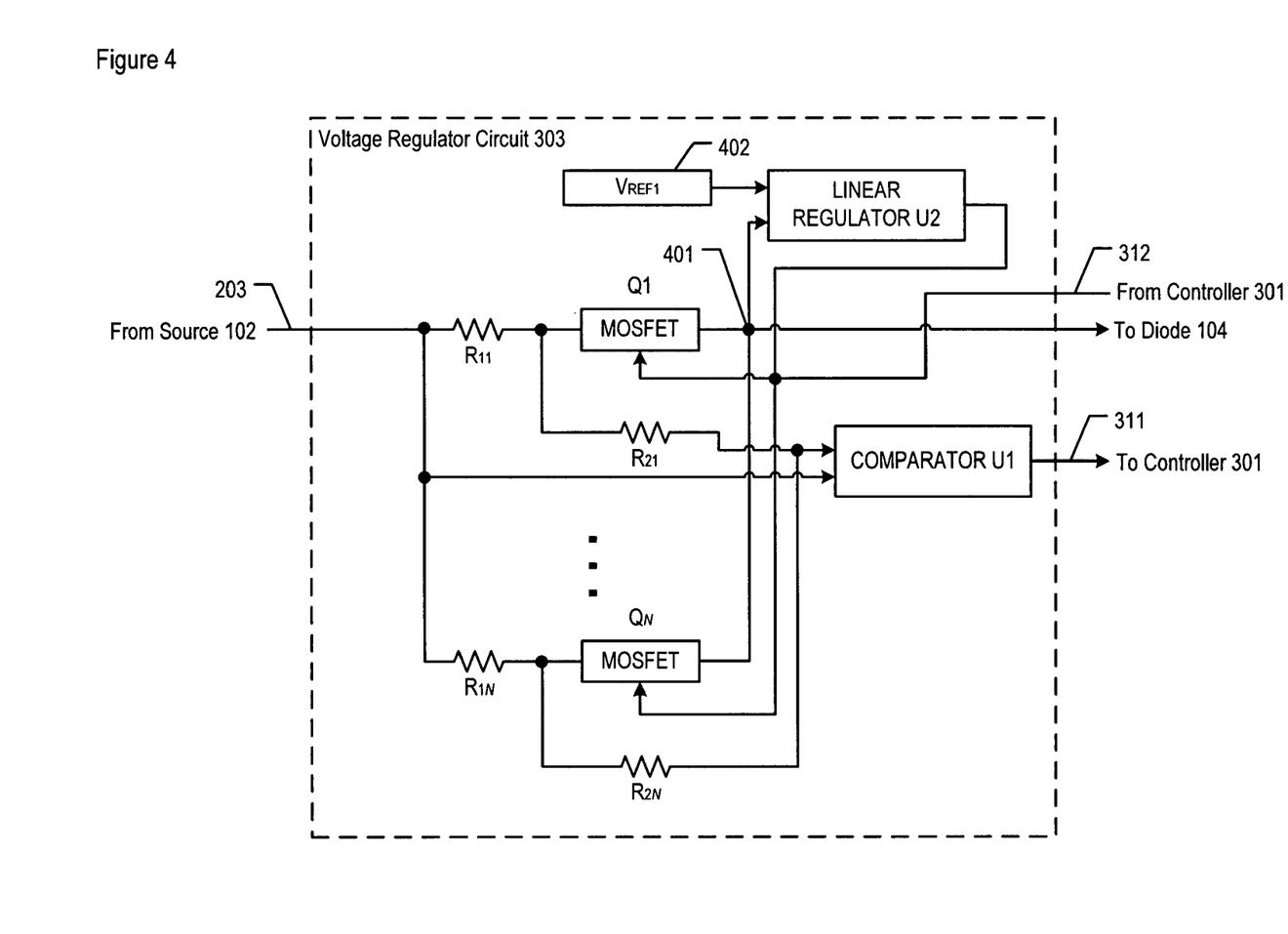
FIG. 4 depicts a schematic diagram of the salient components of voltage regulator circuit 303 of unit 201.

FIG. 4 depicts the salient components of voltage-regulator circuit 303, in accordance with the illustrative embodiment of the present invention. In addition to providing an output voltage while operating in a linear mode, circuit 303 comprises the means to sense whether a predetermined conducting current is present in the output path to load 110, at node 401, and also the means to switch between the linear mode of operation and a saturated mode of operation, based in part on the presence of the conducting current and as controlled by controller 301.

Circuit 303 comprises linear voltage regulator U2 for the purpose of operating in linear mode, in well-known fashion. The particular operating voltage is based on first reference-voltage source 402, which is related to the first output voltage of circuit 303. In accordance with the illustrative embodiment, circuit 303 outputs a first output voltage of 21.6 Volts DC when it operates in linear mode, dissipating only a couple of watts while operating in this mode. While in linear mode, regulator U2 provides a suitable signal that keeps MOSFET transistors $Q_1$ through $Q_N$ (described below) from going into saturation, while the first output voltage is maintained.

In accordance with the illustrative embodiment, circuit 303 also comprises a plurality of input-resistor-and-transistor pairs, each pair comprising namely resistor $R_{1,n}$ that is electrically connected to MOSFET transistor $Q_n$, wherein the value of n is between 1 and N, and wherein N is equal to the number of resistor-transistor pairs in the design. Circuit 303 also comprises summing-amplifier resistor $R_{2,n}$ which is electrically connected to each input-resistor-transistor pair as shown. Multiple summing resistors are used in order to lessen the effect of the variation of any single resistor from its stated value (i.e., its tolerance). The summing resistors feed into comparator component U1, comprising one or more operational amplifiers, which compares the summed signal from the summing resistors against a second reference voltage, and provides an output signal to controller 301 that indicates whether the predetermined conducting current is present or not. In short, summing-amplifier resistors $R_{2,1}$ through $R_{2,N}$ and comparator U1 constitute a circuit portion that is used to sense the conducting current.

Additionally, circuit 303 comprises a circuit portion that is used to switch between a linear mode of operation and a saturated mode of operation, in accordance with the illustrative embodiment of the present invention. As already mentioned, circuit 303 outputs 21.6 Volts DC when operating in linear mode. In accordance with the illustrative embodiment, circuit 303 outputs a second output voltage of 33.6 Volts DC when it is switched to operate in saturated mode and dissipates around 10 Watts or so while in this second mode. As those who are skilled in the art will appreciate, voltage regulator circuit 303 can be designed to provide a different set of first and second output voltages in some alternative embodiments.

The switching of circuit 303 from linear mode to saturated mode is accomplished by controller 301 providing a control signal via path 312 to the gate of each MOSFET transistor Qn. Specifically, when the voltage that that corresponds to the control signal is applied, each transistor Qn is driven into saturation. In saturated mode, circuit 303 itself provides the power to load 110, albeit for a relatively short amount of time as described later. Otherwise, circuit 303 operates in linear mode for most of the time, thereby dissipating a relatively small amount of power.

Figure 5:
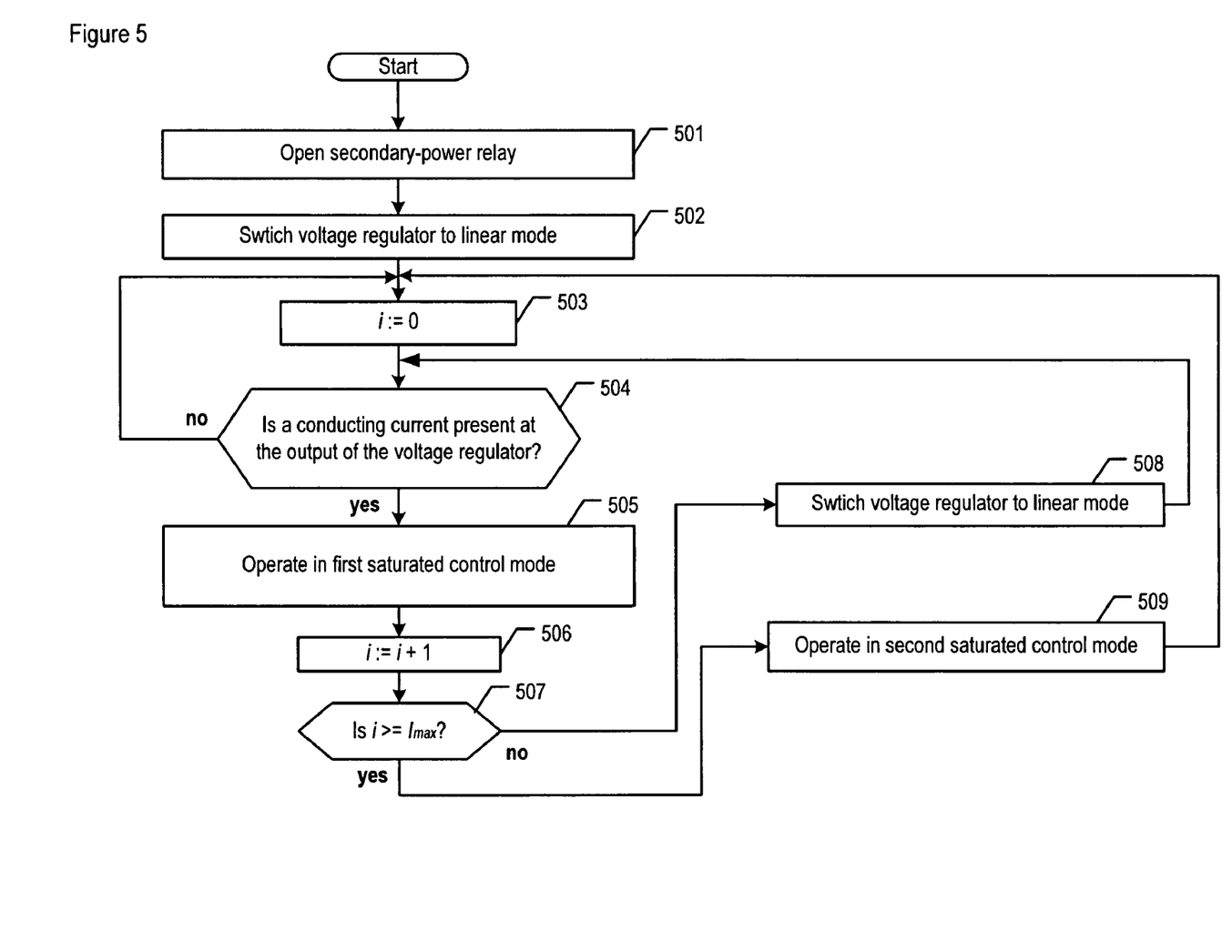
FIG. 5 depicts a flowchart of the salient tasks performed by controller 301 in controlling relay 302 and voltage regulator circuit 303.

FIG. 5 depicts a flowchart of the salient tasks performed by controller 301, in accordance with the illustrative embodiment of the present invention. Controller 301 performs the described tasks, in order to control how relay 302 and voltage regulator circuit 303 operate, so that the source of power for load 110 can be selected between primary power source 101 and secondary power source 102. It will be clear to those skilled in the art which tasks depicted in FIG. 5 can be performed simultaneously or in a different order from that depicted. Additionally, it will be clear to those skilled in the art how to condition the signals that are to be received by or that are transmitted from controller 301, in order to make those signals suitable for use.

At task 501, controller 301 opens secondary-power relay 302. This has the effect of powering load 110 via primary power source 101, not secondary source 102.

At task 502, controller 301 provides a signal to switch voltage regulator circuit 303 to linear mode. In accordance with the illustrative embodiment, circuit 303 as a result outputs 21.6 Volts DC while in linear mode.

At task 503, controller 301 resets counter i to zero.

At task 504, controller 301 monitors for a signal that indicates that a conducting current is present at the output of voltage regulator circuit 303. If such a signal is received, task execution proceeds to task 505. Otherwise, no conducting current is present and task execution consequently proceeds back to task 503 with circuit 303 essentially continuing to operate in linear mode until the conducting current is detected to be present.

As seen in the flowcharts, controller 301 will conceivably go on to check for the conducting current a total of $I_{max}$ times during a given period of time that relay 302 is open. The current is checked for, only after the first voltage has been applied to the output terminal of circuit 303 during a predetermined time interval, which is equal in this case to ($I_{max}$*T), wherein T is described below and with respect to task 602. In accordance with the illustrative embodiment, $I_{max}$ has a value of three, and T has a value of one second, but alternative embodiments of $I_{max}$ and T can have different values, as those who are skilled in the art will appreciate.

At task 505, controller 301 configures power switching unit 201 to operate in a first saturated control mode for a specified wait time, which mode is described below and with respect to FIG. 6.

At task 506, after the wait time has passed, controller 301 increments counter i.

At task 507, controller 301 determines whether a check for a conducting current has been made $I_{max}$ times, wherein $I_{max}$ is a positive integer. If this is not the case, task execution proceeds to task 508. Otherwise, controller 301 has checked for the presence of the conducting current $I_{max}$ times, and task execution consequently proceeds to task 509.

At task 508, controller 301 switches voltage regulator circuit 303 to operate in linear mode (21.6 Volts DC). The purpose of this is to quickly check whether a conducting current is present. Task execution then proceeds back to task 504.

At task 509, controller 301 configures power switching unit 201 to operate in a second saturated control mode, which is described below and with respect to FIG. 7. This occurs when a predetermined conducting current is still present after a predetermined time terminal has elapsed since the monitoring of the current initially occurred (at task 504) and results in relay 302 being closed and power being provided by secondary source 102 until primary source 101 is able to provide the power instead. Once primary source 101 is able, task execution proceeds back to task 503.

Figure 6:
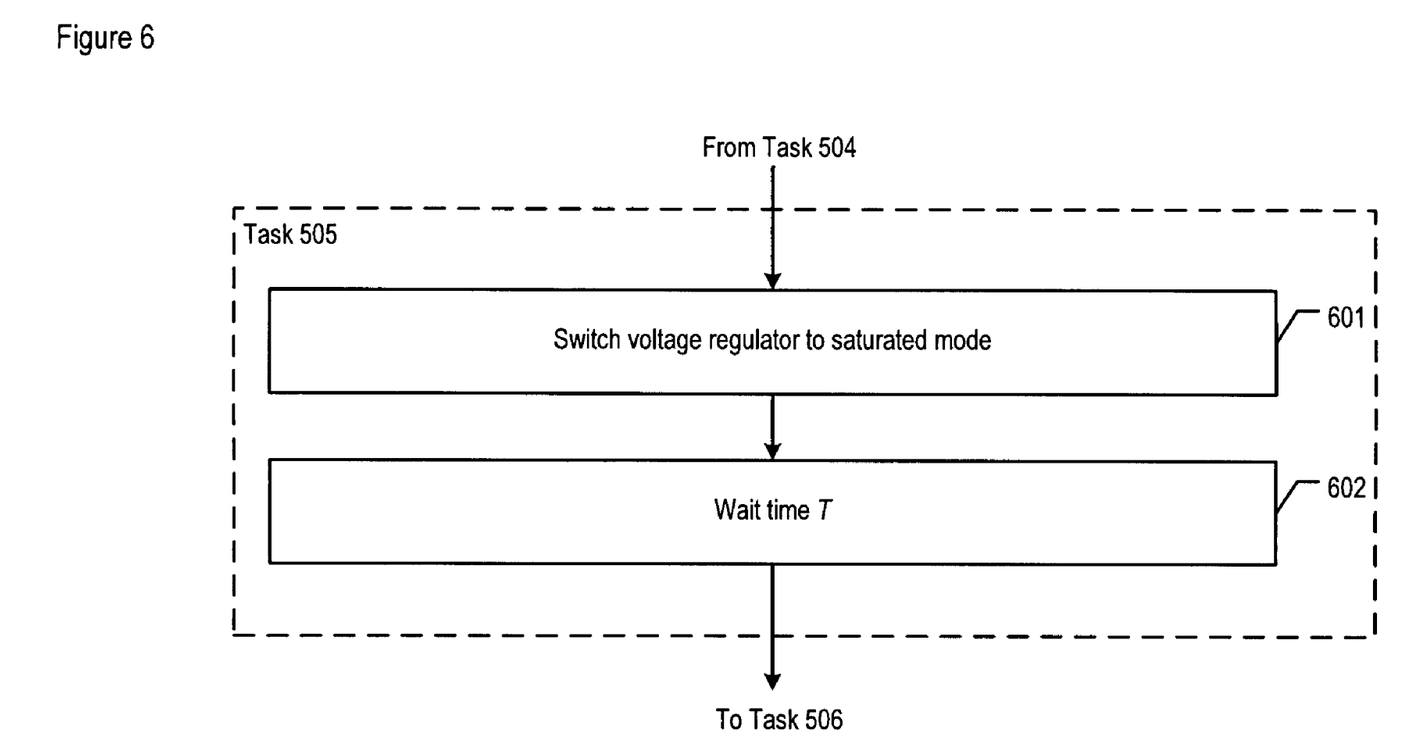
FIG. 6 depicts a flowchart of the salient tasks that are part of a first saturated mode of operation.

FIG. 6 depicts a flowchart of the salient tasks performed when power switching unit 201 operates in accordance with a first saturated control mode. As those who are skilled in the art will appreciate, some of the tasks depicted in FIG. 6 can be performed simultaneously or in a different order from that depicted.

At task 601, controller 301 switches voltage regulator circuit 303 to operate in a saturated mode. In accordance with the illustrative embodiment, circuit 303 outputs 33.6 Volts DC while in saturated mode.

At task 602, controller 301 waits time T before proceeding to the next task, essentially causing circuit 303 to operate in saturated mode for time T. Task execution then proceeds to task 506.

Figure 7:
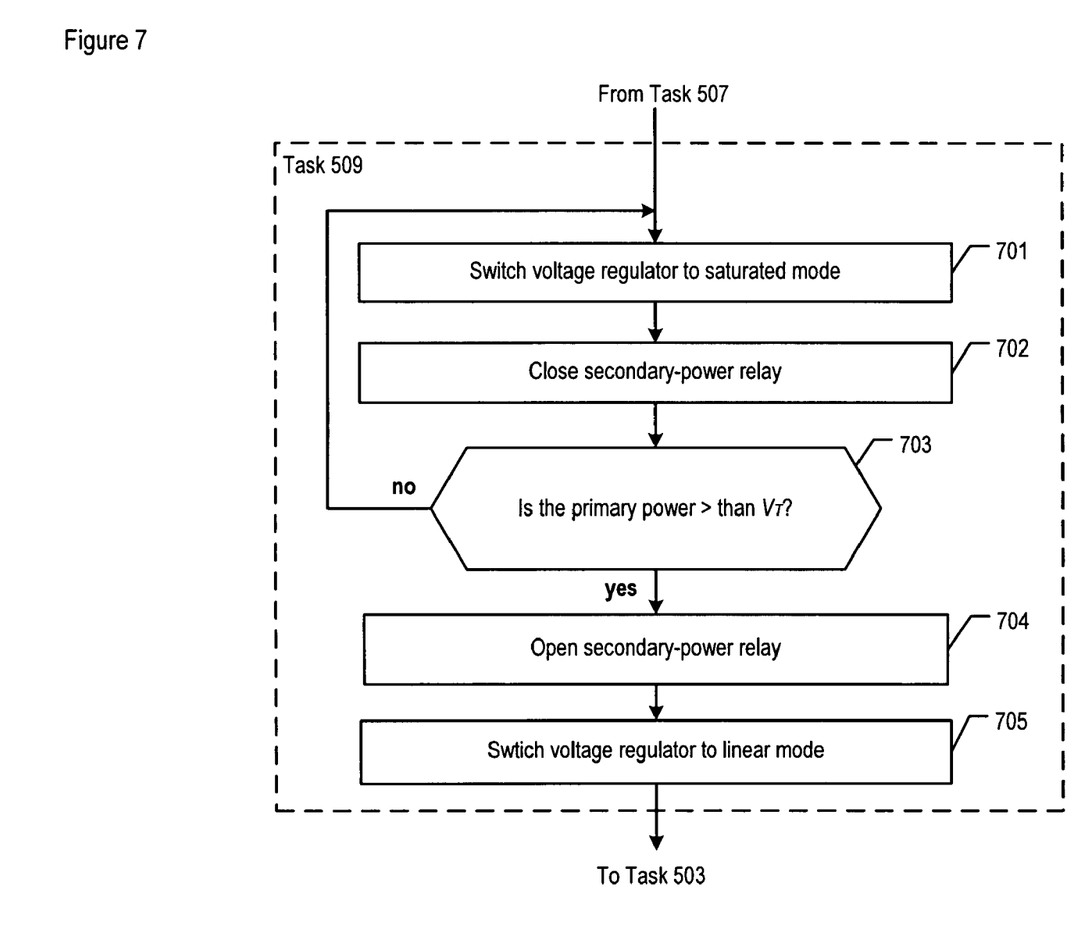
FIG. 7 depicts a flowchart of the salient tasks that are part of a second saturated mode of operation.

FIG. 7 depicts a flowchart of the salient tasks performed when power switching unit 201 operates in accordance with a second saturated control mode. As those who are skilled in the art will appreciate, some of the tasks depicted in FIG. 7 can be performed simultaneously or in a different order from that depicted.

At task 701, controller 301 switches voltage regulator circuit 303 to operate in a saturated mode. In accordance with the illustrative embodiment, in saturated mode the output is 33.6 Volts DC.

At task 702, controller 301 closes secondary-power relay 302. At this point, power switching unit 201 is providing power from secondary power source 102 to load 110, not from primary source 101.

At task 703, controller 301 checks whether primary power source 101 is providing at least a minimally-sufficient output voltage $V_T$, which in accordance with the illustrative embodiment is equal to 22 Volts DC. If not, task execution proceeds back to task 701, thereby maintaining secondary power source 102 as the source to load 110. Otherwise, primary power source 101 is now at sufficient voltage, and task execution proceeds to task 704.

At task 704, controller 301 opens secondary-power relay 302. At this point, power switching unit 201 is providing power from primary power source 101 to load 110.

At task 705, controller 301 provides a signal in order to switch voltage regulator circuit 303 to operate in linear mode. In accordance with the illustrative embodiment, circuit 303 as a result outputs 21.6 Volts DC. Task execution then proceeds back to task 503.

In some embodiments, controller 301 configures secondary power source 102 to accept power from primary power source 101 for charging purposes during at least some of the time while voltage regulator circuit 303 is operating in linear mode.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A power system comprising: a relay having a first terminal and a second terminal, the first terminal of the relay being electrically coupled to a secondary power source;
a controller;
a voltage regulator circuit having an input terminal and an output terminal, the input terminal of the voltage regulator circuit being directly electrically connected to the first terminal of the relay, the output terminal of the voltage regulator circuit being directly electrically connected to the second terminal of the relay, and the voltage regulator circuit being capable of switching, based on a control signal received from the controller, between providing a first output voltage and providing a second output voltage, wherein the provided output voltage is applied to the output terminal of the voltage regulator circuit; and
a first diode and a second diode, each having a first terminal and a second terminal, the first terminal of the first diode being electrically coupled to a primary power source, the second terminal of the first diode being electrically coupled to a load, the first terminal of the second diode being electrically coupled to the second terminal of the relay and to the output terminal of the voltage regulator circuit, and the second terminal of the second diode being electrically coupled to the load;
wherein the power system enables the load to be powered by the primary power source during normal operation, wherein an output voltage from the primary power source is lower than an output voltage from the secondary power source.

2. The power system of claim 1 wherein the secondary power source is a battery.

3. The power system of claim 2 wherein the battery is also electrically coupled to the primary power source, wherein the primary power source charges the battery during normal operation.

4. The power system of claim 1 wherein the controller is for selecting, via the control signal to the voltage regulator circuit, between the first output voltage and the second output voltage to be provided by the voltage regulator circuit, based on a voltage that is present at the first terminal of the first diode.

5. The power system of claim 4 wherein the selection between the first output voltage and the second output voltage is also based on whether a predetermined conducting current exists at the output terminal of the voltage regulator circuit.

6. The power system of claim 5 wherein the first output voltage is based on a minimum acceptable output voltage from the primary power source, and wherein the second output voltage is also based on the output voltage from the secondary power source.

7. The power system of claim 6 wherein the first output voltage is substantially equal to 21.6 Volts DC and the second output voltage is substantially equal to 33.6 Volts DC.

8. A power system coupled to a load, the power system comprising:
a relay having a first terminal and a second terminal, the first terminal of the relay being electrically coupled to a secondary power source;
a voltage regulator circuit having an input terminal and an output terminal, the input terminal of the voltage regulator circuit being electrically coupled to the first terminal of the relay, the output terminal of the voltage regulator circuit being electrically coupled to the second terminal of the relay, and the voltage regulator circuit being capable of switching, based on a control signal received from a controller, between providing a first output voltage and providing a second output voltage, wherein the provided output voltage is applied to the output terminal of the voltage regulator circuit; and
the controller for selecting, via the control signal to the voltage regulator circuit, between the first output voltage and the second output voltage, wherein the selecting is based on the voltage level being provided by a primary power source that is different from the secondary power source, and for controlling the relay;
wherein whether the load receives power from (i) the primary power source or (ii) the secondary power source is based on the voltage level of the provided output voltage that is applied to the output terminal of the voltage regulator circuit, and wherein the power system enables the load to be powered by the primary power source during normal operation, wherein an output voltage from the primary power source is lower than an output voltage from the secondary power source.

9. The power system of claim 8 further comprising a first diode and a second diode, each having a first terminal and a second terminal, the first terminal of the first diode being electrically coupled to the primary power source, the second terminal of the first diode being electrically coupled to the load, the first terminal of the second diode being electrically coupled to the second terminal of the relay and to the output terminal of the voltage regulator circuit, and the second terminal of the second diode being electrically coupled to the load.

10. The power system of claim 8 wherein the secondary power source is a battery.

11. The power system of claim 10 wherein the battery is also electrically coupled to the primary power source, wherein the primary power source charges the battery at least some of the time.

12. The power system of claim 8 wherein the selection between the first output voltage and the second output voltage is also based on whether a predetermined conducting current exists at the output terminal of the voltage regulator circuit.

13. The power system of claim 12 wherein the first output voltage is based on a minimum acceptable level of the output voltage from the primary power source, and wherein the second output voltage is also based on the output voltage from the secondary power source.

14. A method for selecting the voltage that is presented to a load that is electrically coupled to both a primary power source and a secondary power source, the method comprising:

opening a relay having a first terminal and a second terminal, the first terminal of the relay being electrically coupled to the secondary power source;

providing a first output voltage at an output terminal of a voltage regulator circuit that also has an input terminal that is electrically coupled to the first terminal of the relay, the output terminal being electrically coupled to the second terminal of the relay;

monitoring whether a predetermined conducting current is present at the output terminal of the voltage regulator circuit;

providing a second output voltage at the output terminal of the voltage regulator circuit based on the predetermined conducting current being detected as having become present, the second output voltage being greater than the first output voltage;

and closing the relay based on the predetermined conducting current remaining present for a predetermined time interval after being detected as having become present, the predetermined conducting current being measured at least once with respect to the first output voltage being provided to the output terminal during the predetermined time interval;

wherein the power system enables the load to be powered by the primary power source during normal operation, wherein an output voltage from the primary power source is lower than an output voltage from the secondary power source.

15. The method of claim 14 further comprising opening the relay when the output voltage level from the primary power source rises above a threshold voltage $V_T$, wherein $V_T$ is based on the first output voltage level.

16. The method of claim 15 wherein $V_T$ is substantially equal to 22 Volts DC.

17. The method of claim 15 further comprising providing the first output voltage at the output terminal of the voltage regulator circuit based on the output voltage level from the primary power source rising above $V_T$.

18. The method of claim 17, wherein the secondary power source is a battery, and further comprising charging the battery from the primary power source based on the first output voltage being provided at the output terminal of the voltage regulator circuit.

19. The method of claim 14 wherein the first output voltage is based on a minimum acceptable level of the output voltage from the primary power source, and wherein the second output voltage is based on the output voltage from the secondary power source.

20. The method of claim 19 wherein the first output voltage is substantially equal to 21.6 Volts DC and the second output voltage is substantially equal to 33.6 Volts DC.

* * * * *